United States Patent
Chen

(10) Patent No.: US 9,306,427 B2
(45) Date of Patent: Apr. 5, 2016

(54) ASSEMBLY STRUCTURE FOR END COVER AND SHELL OF MOTOR

(71) Applicant: Zhongshan Broad-Ocean Motor Manufacturing Co., Ltd., Zhongshan (CN)

(72) Inventor: Fang Chen, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 285 days.

(21) Appl. No.: 13/844,972

(22) Filed: Mar. 16, 2013

(65) Prior Publication Data

US 2014/0145532 A1     May 29, 2014

(30) Foreign Application Priority Data

Nov. 29, 2012   (CN) ...................... 2012 2 0647291 U

(51) Int. Cl.
*H02K 5/15*     (2006.01)
*H02K 5/06*     (2006.01)

(52) U.S. Cl.
CPC ... *H02K 5/15* (2013.01); *H02K 5/06* (2013.01)

(58) Field of Classification Search
CPC ............. H02K 5/15; H02K 5/06; H02K 5/02; H02K 5/04
USPC .................... 310/89, 154.15, 154.14, 154.09, 310/216.131, 216.135, 91, 40 MM
See application file for complete search history.

(56) References Cited

U.S. PATENT DOCUMENTS

| 3,567,973    | A  | * | 3/1971 | Mastrodonato et al. ....... 310/402 |
| 6,984,905    | B2 | * | 1/2006 | Sano et al. ....................... 310/89 |
| 2002/0113506 | A1 | * | 8/2002 | Wong .............................. 310/89 |
| 2009/0015093 | A1 | * | 1/2009 | Reutter et al. ................. 310/254 |

FOREIGN PATENT DOCUMENTS

| GB | 1296429 | * | 11/1972 |
| GB | 2134327 | * | 8/1984  |

* cited by examiner

*Primary Examiner* — Terrance Kenerly
*Assistant Examiner* — Ahmed Elnakib
(74) *Attorney, Agent, or Firm* — Matthias Scholl, PC; Matthias Scholl

(57) ABSTRACT

An assembly structure, including an end cover and a shell. The end cover includes a rabbet, a side wall, and an end surface. The shell includes an end part. A plurality of clamping grooves is arranged at a bottom of the rabbet and on the side wall of the end cover. Through holes are arranged above the clamping grooves and on the end surface of the end cover and communicate with the clamping grooves. A plurality of notch grooves is arranged at the end part of the shell. Clamping strips are arranged above the notch grooves and at the end part of the shell. The end cover is installed at the end part of the shell. The clamping strips are embedded in the clamping grooves for allowing the shell and the end cover to be connected together.

9 Claims, 5 Drawing Sheets

ASSEMBLY STRUCTURE FOR END COVER AND SHELL OF MOTOR

CROSS-REFERENCE TO RELATED APPLICATIONS

Pursuant to 35 U.S.C. §119 and the Paris Convention Treaty, this application claims the benefit of Chinese Patent Application No. 201220647291.X filed Nov. 29, 2012, the contents of which are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to an assembly structure for an end cover and a shell of a motor.

2. Description of the Related Art

In the micro motor industry, the connection between the cast aluminum end cover and the shell usually adopts the way of installing clips or nailing screws. Although both the two installation methods can realize assembly, disassembly and repair, extra parts and accessories are additionally arranged in the motor, and parts and components are adopted. Thus, the working process is complicated, the installation is troublesome, and the assembly efficiency is low.

SUMMARY OF THE INVENTION

In view of the above-described problems, it is one objective of the invention to provide an assembly structure for an end cover and a shell of a motor. The assembly structure has the advantages of simple structure, reduced parts and components, simplified working process, reduced cost, firmness and reliability in connection and easiness in assembly and disassembly.

To achieve the above objective, in accordance with one embodiment of the invention, there is provided an assembly structure, comprising: an end cover, the end cover comprising a rabbet, a side wall, and an end surface; and a shell, the shell comprising an end part. A plurality of clamping grooves is arranged at a bottom of the rabbet and on the side wall of the end cover. Through holes are arranged above the clamping grooves and on the end surface of the end cover and communicate with the clamping grooves. A plurality of notch grooves is arranged at the end part of the shell. Clamping strips are arranged above the notch grooves and at the end part of the shell. The end cover is installed at the end part of the shell. The clamping strips are embedded in the clamping grooves for allowing the shell and the end cover to be connected together.

In a class of this embodiment, grooves are arranged below the middles of the clamping grooves and on the side wall of the end cover and communicate with the clamping grooves.

In a class of this embodiment, the clamping strips are strip-shaped.

In a class of this embodiment, the notch grooves are strip-shaped grooves.

In a class of this embodiment, the end cover is formed by aluminum casting.

Advantages of the invention are summarized as follows:

(1) a rabbet is arranged on the end cover of the assembly structure, a plurality of clamping grooves is arranged at the bottom of the rabbet and on the side wall of the end cover, through holes are arranged above the clamping grooves and on the end surface of the end cover and communicate with the clamping grooves, a plurality of notch grooves is arranged at the end part of the shell, clamping strips are arranged above the notch grooves and at the end of the shell, the end cover is installed at the end part of the shell, and the clamping strips are embedded in the clamping grooves for allowing the shell and the end cover to be connected together, therefore, parts and components for example clips or screws are reduced, and the assembly structure is simple, simplified in working process, reduced in cost, firm and reliable in connection and easy to assemble and disassemble;

(2) grooves are arranged below the middles of the clamping grooves and on the side wall of the end cover and communicate with the clamping grooves, when the clamping strips are embedded in the clamping groove in a riveted manner, the grooves are convenient for installation of the clamping strips, thus the structural design is reasonable, and the installation is easy; and (3) the clamping grooves are strip-shaped, the notch grooves are strip-shaped grooves, the structural design is reasonable, and the clamping strips are easily riveted, so as to be convenient for assembly of the shell and the end cover.

DETAILED DESCRIPTION OF THE EMBODIMENTS

Example 1

Figure 1:
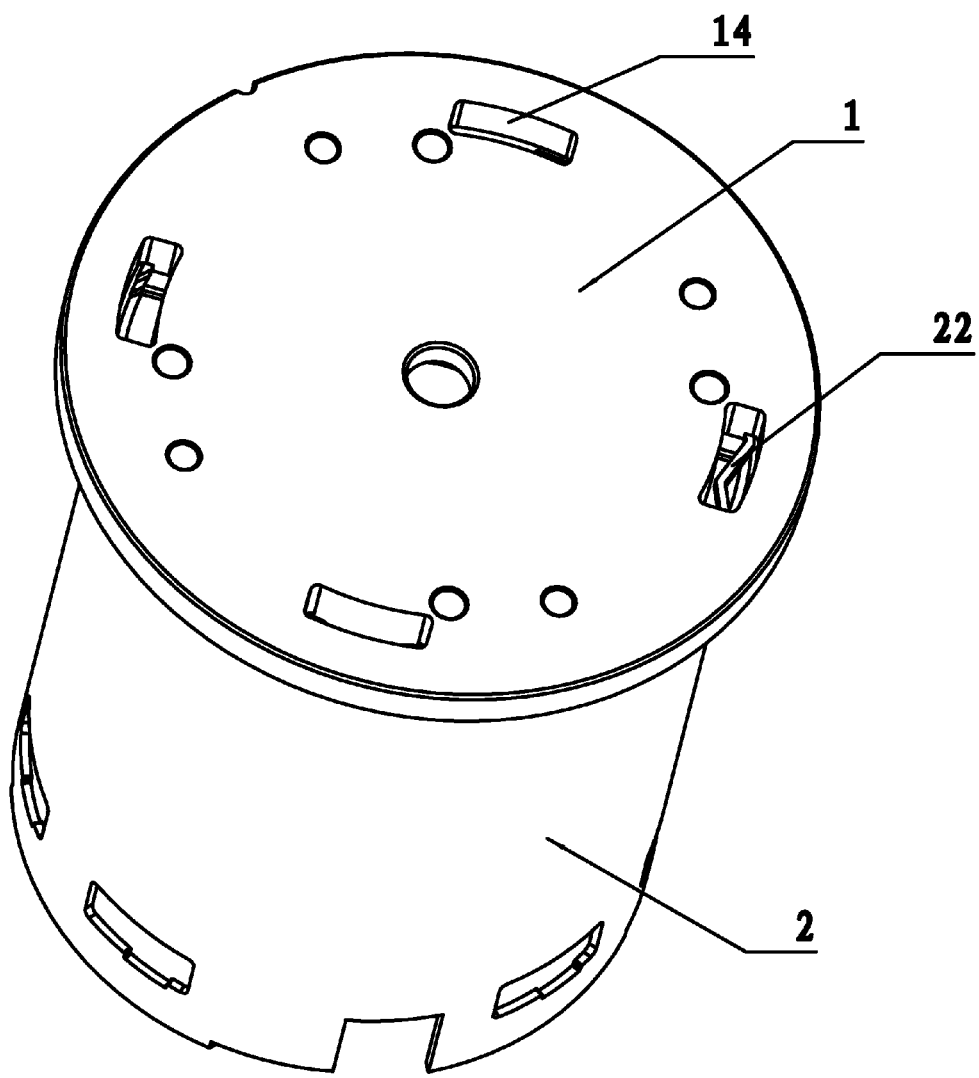
FIG. 1 is a stereograph of an assembly structure of the invention.
Figure 2:
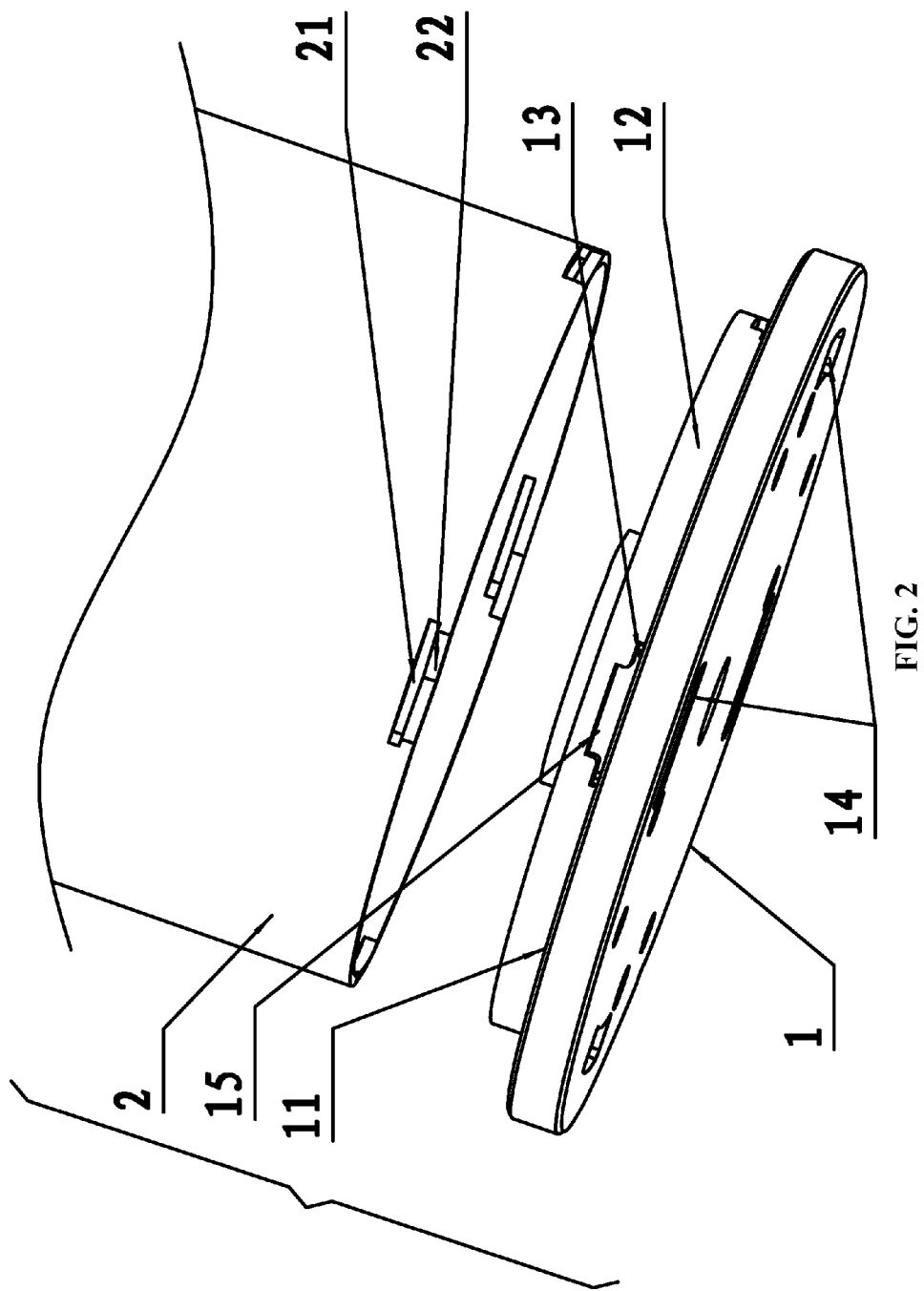
FIG. 2 is an exploded view of an assembly structure of the invention.
Figure 3:
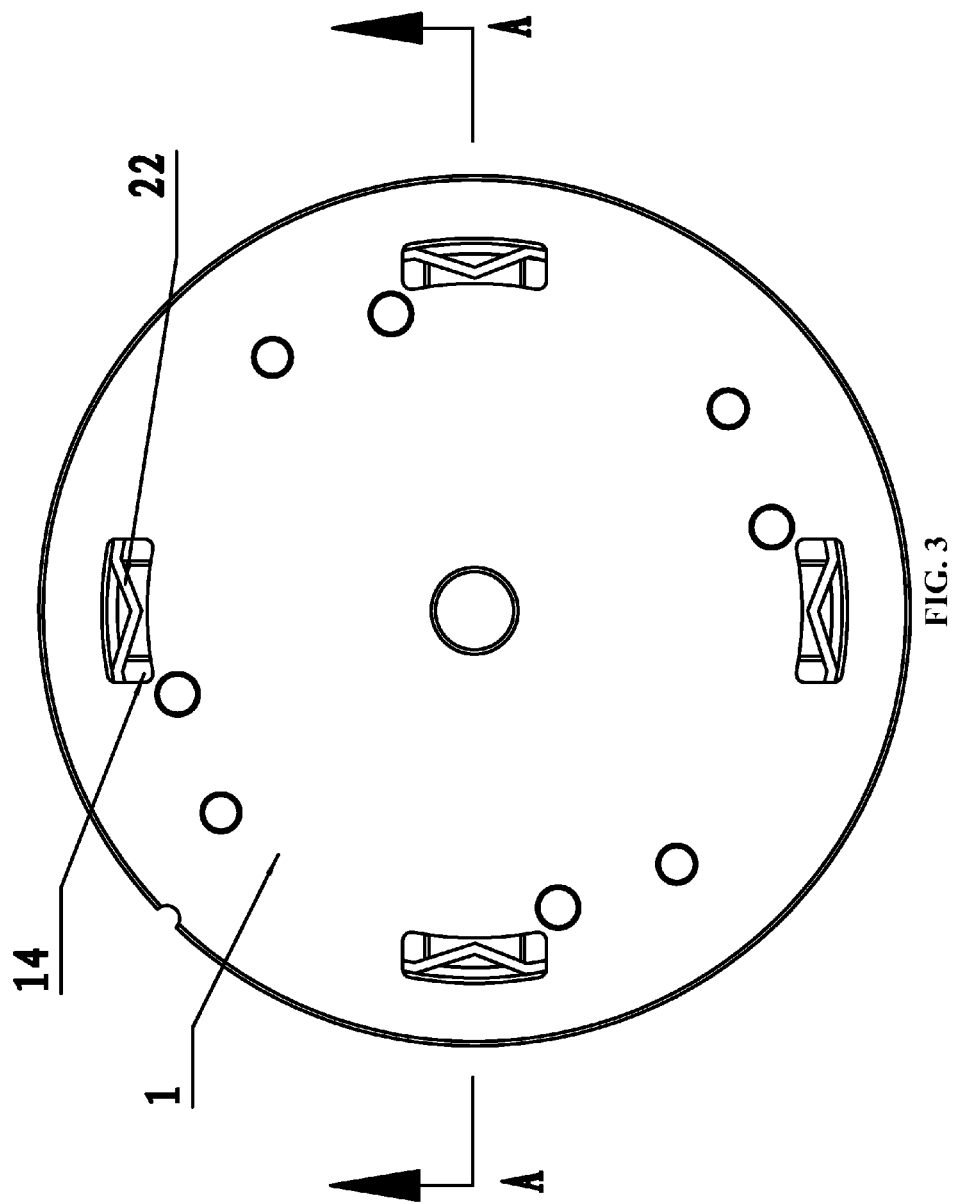
FIG. 3 is a schematic diagram of an assembly structure of the invention.
Figure 4:
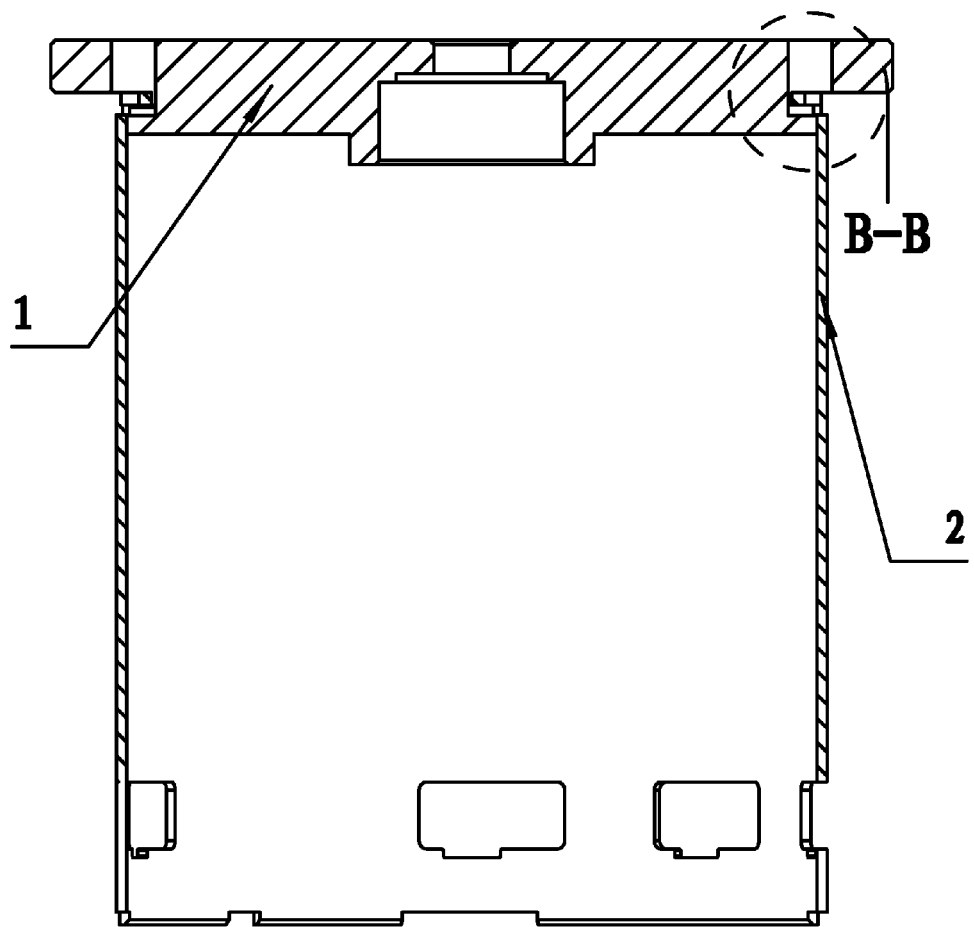
FIG. 4 is a sectional view of FIG. 3 taken from line A-A.
Figure 5:
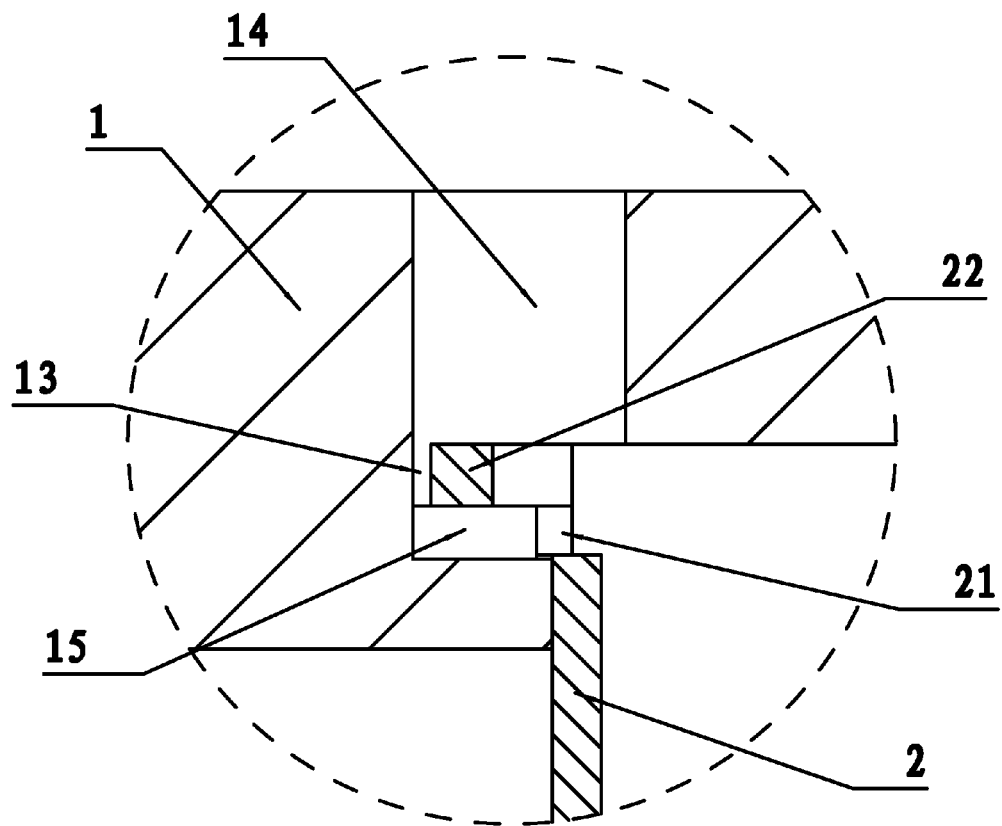
FIG. 5 is an enlarged view of part B-B of FIG. 4.

As shown in FIGS. 1-5, an assembly structure for an end cover and a shell of a motor comprises an end cover 1 and a shell 2. A rabbet 11 is arranged on the end cover 1. A plurality of clamping grooves 13 is arranged at the bottom of the rabbet 11 and on the side wall of the end cover 1. Through holes 14 are arranged above the clamping grooves 13 and on the end surface of the end cover 1 and communicate with the clamping grooves 13. A plurality of notch grooves 21 is arranged at the end part of the shell 2. Clamping strips 22 are arranged above the notch grooves 21 and at the end part of the shell 2. The end cover 1 is installed at the end part of the shell 2, and the clamping strips 22 are embedded in the clamping grooves 13 for allowing the shell 2 and the end cover 1 to be connected together.

Example 2

On the basis of Example 1, the technical characteristics are added as follows: grooves 15 are arranged below the middles of the clamping grooves 13 and on the side wall 12 of the end cover 1 and communicate with the clamping grooves 13.

Example 3

On the basis of Example 1 or 2, the technical characteristic is added as follows: the clamping strips 22 are strip-shaped.

Example 4

On the basis of Example 1 or 2, the technical characteristic is added as follows: the notch grooves 21 are strip-shaped grooves.

Example 5

On the basis of Example 1 or 2, the technical characteristic is added as follows: the end cover 1 is formed by aluminum casting.

The rabbet 11 is arranged on the end cover 1, a plurality of clamping grooves 13 is arranged at the bottom of the rabbet 11 and on the side wall 12 of the end cover 1. The through holes 14 are arranged above the clamping grooves and on the end surface of the end cover and communicate with the clamping grooves 13. A plurality of notch grooves 21 is arranged at the end part of the shell 2, clamping strips 22 are arranged above the notch grooves 21 and at the end part of the shell 2. The end cover 1 is installed at the end part of the shell 2, and a riveting tool is used for riveting, so that the clamping strips 22 in the notch grooves 21 are embedded in the clamping grooves 13 under deformation for allowing the shell 2 and the end cover 1 to be connected together.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An assembly structure, comprising:
   a) an end cover, the end cover comprising a rabbet, a cylindrical side wall having a plurality of clamping grooves, and an end plate having a plurality of through holes; and
   b) a cylindrical shell, the cylindrical shell comprising an end part, and the end part comprising a plurality of notch grooves and a plurality of clamping strips; wherein:
   the cylindrical side wall extends perpendicularly from the end plate;
   the end plate protrudes radially outwards from the cylindrical side wall, wherein the rabbet is formed between the end plate and the cylindrical side wall;
   the clamping grooves are arranged circumferentially around a bottom of the rabbet and on the cylindrical side wall;
   the through holes are arranged circumferentially on the end plate, and each of the through holes is connected to one of the clamping grooves;
   the notch grooves are arranged circumferentially at the end part, wherein one of the clamping strips is formed at the end part and next to each of the notch grooves;
   the cylindrical side wall is inserted inside the cylindrical shell;
   the end plate abuts the end part;
   the end part is disposed in the rabbet;
   each of the clamping strips is a singular continuous strip;
   each of the clamping strips is embedded in one of the clamping grooves through a riveting deformation, wherein the cylindrical shell and the end cover are connected together; and
   a plurality of grooves are arranged on the side wall, each of the grooves is connected to one of the clamping grooves, and each of the grooves extends from a middle portion of one of the clamping grooves and away from the end plate.

2. The assembly structure of claim 1, wherein the clamping strips are strip-shaped.

3. The assembly structure of claim 1, wherein the notch grooves are strip-shaped grooves.

4. The assembly structure of claim 1, wherein the end cover is formed by aluminum casting.

5. The assembly structure of claim 1, wherein each of the through holes is adapted for positioning one of the clamping strips during the riveting deformation.

6. The assembly structure of claim 1, wherein the notch grooves are adapted to prevent the portions of the cylindrical shell except for the clamping strips from deformation during the riveting deformation.

7. The assembly structure of claim 1, wherein the grooves are adapted for pulling the clamping strips out of the clamping grooves.

8. An assembly structure, comprising:
   a) an end cover, the end cover comprising a rabbet, a cylindrical side wall having a plurality of clamping grooves, and an end plate having a plurality of through holes; and
   b) a cylindrical shell, the cylindrical shell comprising an end part, and the end part comprising a plurality of notch grooves and a plurality of clamping strips; wherein:
   the cylindrical side wall extends perpendicularly from the end plate;
   the end plate protrudes radially outwards from the cylindrical side wall, wherein the rabbet is formed between the end plate and the cylindrical side wall;
   the clamping grooves are arranged circumferentially around a bottom of the rabbet and on the cylindrical side wall;
   the through holes are arranged circumferentially on the end plate, and each of the through holes is connected to one of the clamping grooves;
   the notch grooves are arranged circumferentially at the end part, wherein one of the clamping strips is formed at the end part and next to each of the notch grooves;
   the cylindrical side wall is inserted inside the cylindrical shell;
   the end plate abuts the end part;
   the end part is disposed in the rabbet;
   each of the clamping strips is a singular continuous strip;
   each of the clamping strips is embedded in one of the clamping grooves through a riveting deformation, wherein the cylindrical shell and the end cover are connected together; and
   each of the through holes is adapted for positioning one of the clamping strips during the riveting deformation.

9. An assembly structure, comprising:
   a) an end cover, the end cover comprising a rabbet, a cylindrical side wall having a plurality of clamping grooves, and an end plate having a plurality of through holes; and
   b) a cylindrical shell, the cylindrical shell comprising an end part, and the end part comprising a plurality of notch grooves and a plurality of clamping strips; wherein:

the cylindrical side wall extends perpendicularly from the end plate;

the end plate protrudes radially outwards from the cylindrical side wall, wherein the rabbet is formed between the end plate and the cylindrical side wall;

the clamping grooves are arranged circumferentially around a bottom of the rabbet and on the cylindrical side wall;

the through holes are arranged circumferentially on the end plate, and each of the through holes is connected to one of the clamping grooves;

the notch grooves are arranged circumferentially at the end part, wherein one of the clamping strips is formed at the end part and next to each of the notch grooves;

the cylindrical side wall is inserted inside the cylindrical shell;

the end plate abuts the end part;

the end part is disposed in the rabbet;

each of the clamping strips is a singular continuous strip;

each of the clamping strips is embedded in one of the clamping grooves through a riveting deformation, wherein the cylindrical shell and the end cover are connected together; and the notch grooves are adapted to prevent the portions of the cylindrical shell except for the clamping strips from deformation during the riveting deformation.

* * * * *